(12) United States Patent
Weitzler

(10) Patent No.: US 10,041,266 B1
(45) Date of Patent: Aug. 7, 2018

(54) SUSPENSION SYSTEM FOR DISTRIBUTING FORCES

(71) Applicant: David Alan Weitzler, Framingham, MA (US)

(72) Inventor: David Alan Weitzler, Framingham, MA (US)

(*) Notice: Subject to any disclaimer, the term of this patent is extended or adjusted under 35 U.S.C. 154(b) by 0 days.

(21) Appl. No.: 15/459,931

(22) Filed: Mar. 15, 2017

(51) Int. Cl.
| | |
|---|---|
| *E04H 9/02* | (2006.01) |
| *E04B 1/34* | (2006.01) |
| *E04B 1/343* | (2006.01) |
| *E04B 1/98* | (2006.01) |
| *B63B 39/00* | (2006.01) |
| *B63B 35/44* | (2006.01) |
| *H02K 7/18* | (2006.01) |
| *F03B 13/16* | (2006.01) |
| *B63B 21/04* | (2006.01) |
| *B63B 21/16* | (2006.01) |
| *B63B 21/20* | (2006.01) |

(52) U.S. Cl.
CPC ............. *E04H 9/021* (2013.01); *B63B 35/44* (2013.01); *B63B 39/00* (2013.01); *E04B 1/343* (2013.01); *E04B 1/3404* (2013.01); *E04B 1/98* (2013.01); *F03B 13/16* (2013.01); *H02K 7/1853* (2013.01); *B63B 21/04* (2013.01); *B63B 21/16* (2013.01); *B63B 2021/203* (2013.01); *B63B 2708/02* (2013.01)

(58) Field of Classification Search
CPC ................ B63B 35/44; B63B 35/4406; B63B 2021/203; B63B 21/04; E04H 9/021; E04B 1/98; E04B 1/343; E04B 1/3404

USPC ................ 114/230.1, 230.16, 230.2, 230.23
See application file for complete search history.

(56) References Cited

U.S. PATENT DOCUMENTS

| | | | | |
|---|---|---|---|---|
| 3,902,447 A | * | 9/1975 | Slocum .................... | B63B 21/50 114/230.26 |
| 6,935,808 B1 | * | 8/2005 | Dempster ............... | B63B 35/44 405/28 |
| 7,197,999 B2 | * | 4/2007 | Murray .................... | B63B 21/50 114/264 |
| 8,118,538 B2 | * | 2/2012 | Pao ......................... | B63B 21/50 415/115 |

(Continued)

FOREIGN PATENT DOCUMENTS

GB 2066191 A * 7/1981 ........... B63B 21/502

*Primary Examiner* — Adriana Figueroa
(74) *Attorney, Agent, or Firm* — Joseph P. Kincart; Rogers Towers, P.A.

(57) ABSTRACT

Disclosed is a suspension system configured for distributing forces impinged on a body. The suspension system may include a plurality of tubes, each including a hollow space configured to accommodate a shaft. Additionally, the suspension system may include a plurality of shafts corresponding to the plurality of tubes. Further, the suspension system may include a plurality of pulleys comprising one or more counterpoised pulleys mounted on one or more ends of one or more shafts of the plurality of shafts and at least two adjunct pulleys mounted on the body. Furthermore, the suspension system may include one or more conduits of tensile force operationally coupled to each of the one or more counterpoised pulleys and the at least two adjunct pulleys. Accordingly, a force acting upon a shaft may be transmitted, via counterpoised pulleys and the one or more conduits of tensile force, to one or more other shafts.

20 Claims, 10 Drawing Sheets

(56) References Cited

U.S. PATENT DOCUMENTS

| | | | | |
|---|---|---|---|---|
| 9,809,283 B2* | 11/2017 | Zhang | ................... | B63B 35/44 |
| 2010/0086362 A1* | 4/2010 | Aubault | ................. | B63B 35/44 |
| | | | | 405/195.1 |
| 2014/0322996 A1* | 10/2014 | Nakamura | ............. | F03B 13/16 |
| | | | | 440/8 |
| 2017/0190391 A1* | 7/2017 | Siegfriedsen | .......... | B63B 21/50 |

* cited by examiner

SUSPENSION SYSTEM FOR DISTRIBUTING FORCES

FIELD OF INVENTION

The present disclosure generally relates to systems for distributing mechanical forces impinged on a body. More specifically, the present disclosure relates to suspension systems configured for distributing forces by means of an arrangement of interactively mobile shafts, pulleys and cables.

BACKGROUND OF THE INVENTION

Several man-made structures have been developed to serve different purposes. The operating environment of these structures may include one or more of land, water, air and outer space. In most situations, these structures are directly or indirectly exposed to the surrounding environment. As a result, these structures may be adversely influenced by undesirable effects of the environment.

One category of such undesirable effects is associated with forces emanating from the environment and acting upon these structures. In particular, structures operating in any environment are susceptible to disturbing forces, such as mechanical forces. These forces are transmitted to structures through direct physical contact through one or more physical media. The undesirable effects of such mechanical forces may range from those that mildly affect operability of these structures to those which threaten the very existence of these structures. For example, several structures require maintenance of physical stability in order to operate properly. However, mechanical forces may disturb the physical stability of a structure by causing an undesirable change in position and/or orientation of one or more parts of a structure.

Accordingly, disturbing forces likely to be experienced in the environment need to be duly considered while designing and/or constructing these structures. However, due to practicalities, several assumptions are made about these disturbing forces. Further, in the interest of reducing costs, in many cases such disturbing forces are ignored if their likelihood of occurrence is rare. On the other hand, in cases where evaluation of the undesired effects of disturbing forces is not performed for whatever reasons, structures may be "over engineered" resulting in increased costs and/or human efforts.

Therefore, there is a need for methods, systems and apparatus for providing stability to structures in the presence of disturbing forces, such as for example, mechanical forces acting on the structures. In particular, there is a need for simple and effective techniques of providing stability to structures against disturbing forces. This need and other needs are satisfied by the various aspects of the present disclosure.

SUMMARY OF THE INVENTION

In accordance with the purposes of the invention, as embodied and broadly described herein, the invention, in one aspect, relates to a suspension system configured for distributing forces as they impinge on a body; bringing stability to said body when it is free moving, but reflecting those, now redistributed forces back, when said body is statically grounded. The suspension system may include a plurality of tubes. A tube may comprise a hollow space configured to accommodate at least a part of a shaft. Further, the tube may be configured to allow translatory motion of the shaft relative to the tube. Furthermore, the translatory motion may be substantially one dimensional. Additionally, a first portion of the tube may be rigidly connected to at least a part of the body. Further, the suspension may include a plurality of shafts corresponding to the plurality of tubes. Furthermore, a shaft corresponding to a tube may be configured to be at least partially accommodated within a hollow space of the tube. Additionally, the suspension may include a plurality of pulleys. Further, the plurality of pulleys may include at least one counterpoised pulley mounted on at least one end of at least one shaft of the plurality of shafts and at least two adjunct pulleys mounted on the body. Furthermore, the suspension may include at least one conduit of tensile force. Furthermore, a first end of the at least one conduit of tensile force may be connected to a first place of the body and a second end of the at least one conduit of tensile force may be connected to a second place of the body. Additionally, the at least one conduit of tensile force may be operationally coupled to each of the at least one counterpoised pulleys and the at least two adjunct pulleys. Further, a force acting upon a shaft of the plurality of shafts may be transmitted at least partially, via counterpoised pulleys and the at least one conduit of tensile force, to each of the one or more other shafts of the plurality of shafts, the first place of the body and the second place of the body.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1:
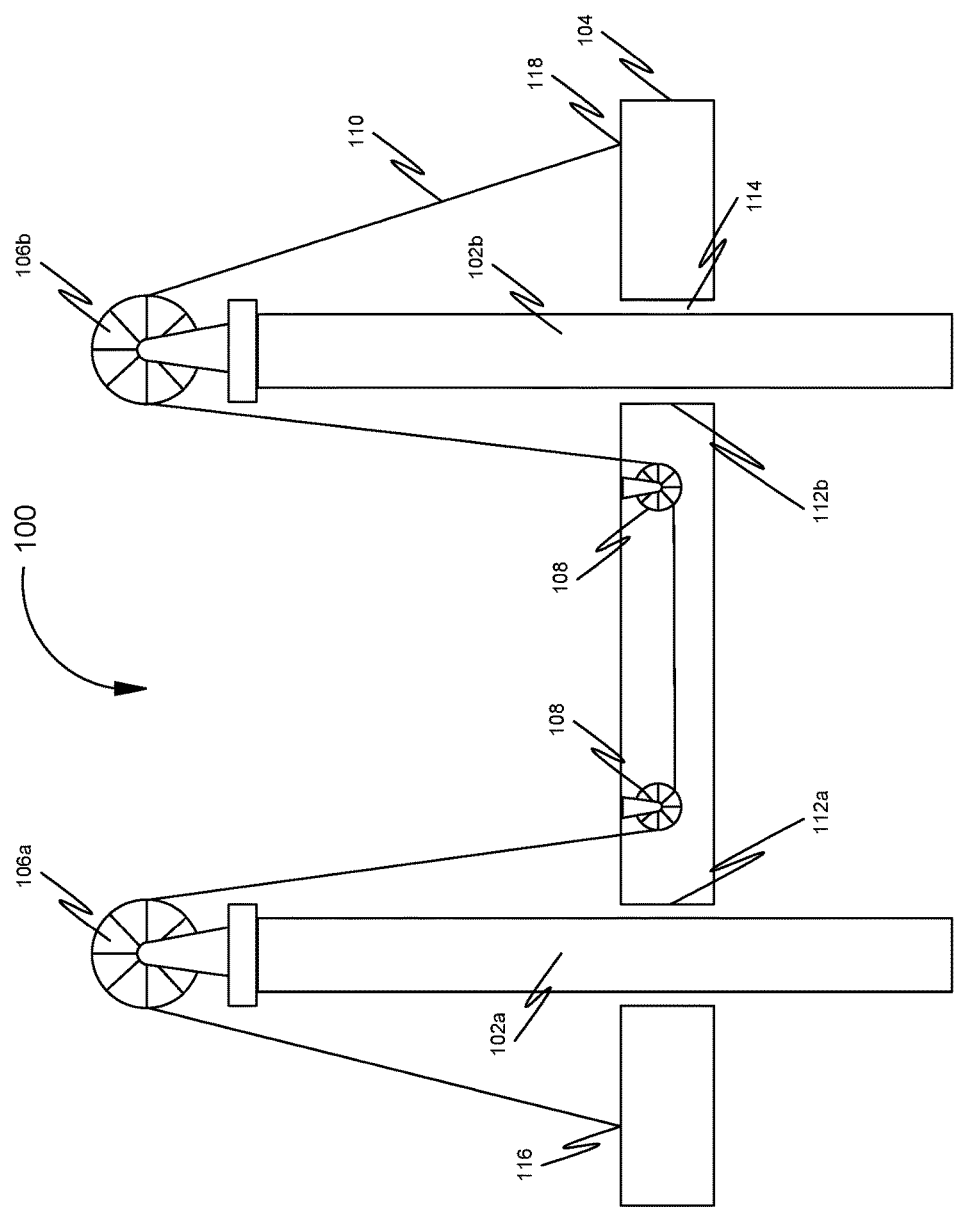
FIG. 1 shows a depiction of a suspension system comprising a plurality of shafts configured to be vertically displaceable through a body while being operably coupled through an arrangement of pulleys and a conduit of tensile force in accordance with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an aperture" includes two or more apertures.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Suspension System for Distributing Forces

As briefly described above, the present disclosure relates, in various aspects, to a suspension system configured for distributing forces about to impinge on a body. In some embodiments, the body may be a mooring. Accordingly, the suspension system may include a plurality of tubes. Further, a tube may include a hollow space configured to accommodate at least a part of a shaft. Further, the tube may be configured to allow translatory motion of the shaft relative to the tube. Furthermore, the translatory motion may be substantially one dimensional. Additionally, a first portion of the tube may be rigidly connected to at least a part of the body.

Further, the suspension may include a plurality of shafts corresponding to the plurality of tubes. Furthermore, a shaft corresponding to a tube may be configured to be at least partially accommodated within a hollow space of the tube. Additionally, in some embodiments, a longitudinal axis of the plurality of shafts may be substantially perpendicular to a major plane of the body. Further, in some embodiments, a form of each of the hollow space and a part of the shaft may be cylindrical. Still further, in some embodiments, each of a tube of the plurality of tubes and a shaft of the plurality of shafts may be configured to minimize wobbling of the shaft in relation to the tube. Yet further, in some embodiments, a longitudinal axis of the plurality of shafts may be aligned parallel to the direction of the force about to impinge.

Additionally, the suspension may include a plurality of pulleys. Further, the plurality of pulleys may include at least one counterpoised pulley mounted on at least one end of at least one shaft of the plurality of shafts and at least two adjunct pulleys mounted on the body.

Further, the suspension may include at least one conduit of tensile force. In some embodiments, the conduit of tensile force may be one or more of a rope, a chain and a cable. Furthermore, a first end of the at least one conduit of tensile force may be connected to a first place of the body and a second end of the at least one conduit of tensile force may be connected to a second place of the body. Additionally, the at least one conduit of tensile force may be operationally coupled to each of the at least one counterpoised pulleys and the at least two adjunct pulleys. Further, a force acting upon a shaft of the plurality of shafts may be transmitted at least partially, via counterpoised pulleys and the at least one conduit of tensile force, to each of the one or more other shafts of the plurality of shafts, the first place of the body and the second place of the body.

In some embodiments, the at least two adjunct pulleys may be mounted within an interior space of the body. Further, at least a part of the at least one conduit of tensile force may lie within the interior space.

In some embodiments, the at least one counterpoised pulley may include a plurality of counterpoised pulleys. Further, the at least one conduit of tensile force may be operatively coupled to each of the plurality of counterpoised pulleys.

In some embodiments, the at least one conduit of tensile force may include a plurality of conduits of tensile force. Further, a plurality of first ends of the plurality of conduits of tensile force may be rigidly connected respectively to each of a plurality of first places of the body and a plurality of second ends of the plurality of conduits of tensile force may be rigidly connected respectively to each of a plurality of second places of the body. Furthermore, the plurality of conduits of tensile force may be operationally coupled to the plurality of pulleys. Additionally, a force acting upon the shaft of the plurality of shafts may be transmitted at least partially, through a single member of the plurality of conduits of tensile force, along those pulleys operationally coupled to it, and on to a single member pair from the plurality of first places and the plurality of second places.

In some embodiments, said force acting upon said shaft of said plurality of shafts may be transmitted at least partially through an additional member of the plurality of conduits of tensile strength along those pulleys operationally coupled to said additional member, and on to an additional member pair from the plurality of first places and the plurality of second places.

In some embodiments, the suspension system may be extended inductively from its single member of the plurality of conduits of tensile force to as many additional as may be deemed necessary.

In some embodiments, the suspension system may further include an electrical generator. Further, the electrical generator may be mechanically coupled with one or more of a tube, a shaft, a pulley and a conduit of tensile force. Further, the electrical generator may be configured to convert one or more of a rotary motion, a linear motion and mechanical stress into electricity.

In some embodiments, the suspension system may further include a plurality of potential-energy storage means attached to the plurality of shafts. Further, a potential-energy storage means may be configured to store potential energy when resisting a linear motion of a shaft with respect to a tube. Furthermore, the potential-energy storage means may be further configured to release the potential energy when supporting an opposite relative motion of shaft with respect to said tube.

In some embodiments, one or more of the plurality of pulleys may be a bearing pulley. Additionally, in some embodiments, the suspension system may further include a thrust bearing corresponding to each counterpoised pulley. Furthermore, said thrust bearing may be inserted between said pulley and said pulley's corresponding shaft. Accordingly, the thrust bearing may bear load in a direction axially parallel to said shaft.

In some embodiments, the suspension system may further include at least one winch attached to the body. Further, the first end of the at least one conduit of tensile force may be rigidly connected to the body. Furthermore, the second end of the at least one conduit of tensile force may be operatively coupled to the at least one winch. Further, a magnitude of tension in the at least one conduit of tensile force may be controllable by cranking the at least one winch.

In some embodiments, the body may include a plurality of segments. Further, at least two adjacent segments of the plurality of segments may be interconnected through a pivotal join. Additionally, in some embodiments, the suspension system may further include at least one latching means configured to separably interconnect the at least two adjacent segments. Further, the pivotal join may range over two or more, pivotal angles of interconnection and by an unlatching and re-latching, said join may then be brought into particular angles. Furthermore, in some embodiments, the suspension system may further include a plurality of latching nubs corresponding to the plurality of shafts. Additionally, each latching nub may be configured to encircle and protrude from a corresponding shaft at or near its poising end. Further, each latching nub may be configured to act as a latching point for deactivation and reactivation of a potential energy storage means attached to a particular shaft by halting or allowing translation of said shaft along its tube.

According to various aspects of the present disclosure, the suspension system can comprise multiple configurations. For example, various exemplary embodiments of the suspension system are shown in FIGS. 1-7.

FIG. 1 shows a depiction of a suspension system 100 comprising a plurality of shafts 102 configured to be vertically displaceable through a body 104 while being operably coupled through an arrangement of counterpoised pulleys 106, adjunct pulleys 108 and a conduit of tensile force 110 in accordance with an exemplary embodiment of the present invention.

Accordingly, the suspension system 100 may include a plurality of tubes 112. Further, a tube 112 may include a hollow space 114 configured to accommodate at least a part of a shaft 102. Further, the tube 112 may be configured to allow translatory motion of the shaft 102 relative to the tube. Furthermore, the translatory motion may be substantially one dimensional. Additionally, a first portion of the tube 112 may be rigidly connected to at least a part of the body 102. For instance, the first portion of the tube 112 may be an integral part of the body 102 formed by an operation such as drilling, cutting etc. performed on the body 102. Additionally, an inner surface of the first portion configured to face an external surface of the tube 112 may be machined to minimize friction. As a result, translatory motion of the shaft 102 through the tube 112 may be facilitated.

Furthermore, the shaft 102 corresponding to the tube 112 may be configured to be at least partially accommodated within the hollow space 114 of the tube 112. Additionally, as illustrated, a longitudinal axis of the plurality of shafts 102 may be substantially perpendicular to a major plane of the body 104.

Further, in some embodiments, a form of each of the hollow space and a part of the shaft 102 may be cylindrical. Still further, in some embodiments, each of the plurality of tubes 112 and the corresponding plurality of shafts 102 may be configured to minimize wobbling of the shaft 102 in relation to the corresponding tube 112.

Yet further, in some embodiments, a longitudinal axis of the plurality of shafts 102 may be aligned parallel to the direction of the force about to impinge on the body 104. For instance, as illustrated, a disturbing force 114 may be incident on, for example, a lower end 116 of one or more of the plurality of shafts 102. As a result, the shaft 102 may be displaced along the longitudinal axis due to the disturbing force 114.

Further, in some embodiments, the conduit of tensile force 110 may be in the form of one or more of a rope, a chain and a cable. Furthermore, a first end of the conduit of tensile force 110 may be connected to a first place 116 of the body 104 and a second end of the conduit of tensile force 110 may be connected to a second place 118 of the body 104. Additionally, the conduit of tensile force 110 may be operationally coupled to each of the counterpoised pulleys 106 and the adjunct pulleys 108. Further, a force, such as the disturbing force 114, acting upon a shaft of the plurality of shafts 102 may be transmitted at least partially, via counterpoised pulleys 106 and the conduit of tensile force 110, to each of the one or more other shafts of the plurality of shafts 102, the first place 116 of the body 104 and the second place 118 of the body 104.

In some embodiments, the suspension system may further include an electrical generator (not shown in figure). Further, the electrical generator may be mechanically coupled with one or more of a tube 112, a shaft 102, a counterpoised pulley 106, an adjunct pulley 108 and a conduit of tensile force 110. Further, the electrical generator may be configured to convert one or more of a rotatory motion, a linear motion and mechanical stress into electricity.

In some embodiments, one or more of the plurality of pulleys may be a bearing pulley. Additionally, in some embodiments, the suspension system may further include a thrust bearing corresponding to each counterpoised pulley. Furthermore, said thrust bearing may be inserted between said pulley and said pulley's corresponding shaft. Accordingly, the thrust bearing may bear load in a direction axially parallel to said shaft.

In some embodiments, the body may include a plurality of segments. Further, at least two adjacent segments of the plurality of segments may be interconnected through a pivotal join. Additionally, in some embodiments, the suspension system may further include at least one latching means configured to separably interconnect the at least two adjacent segments. Further, the pivotal join may range over two or more, pivotal angles of interconnection and by an unlatching and re-latching, said join may then be brought into particular angles. Furthermore, in some embodiments, the suspension system may further include a plurality of latching nubs corresponding to the plurality of shafts. Additionally, each latching nub may be configured to encircle and protrude from a corresponding shaft at or near its poising end. Further, each latching nub may be configured to act as a latching point for deactivation and reactivation of a potential energy storage means attached to a particular shaft by halting or allowing translation of said shaft along its tube.

Figure 2:
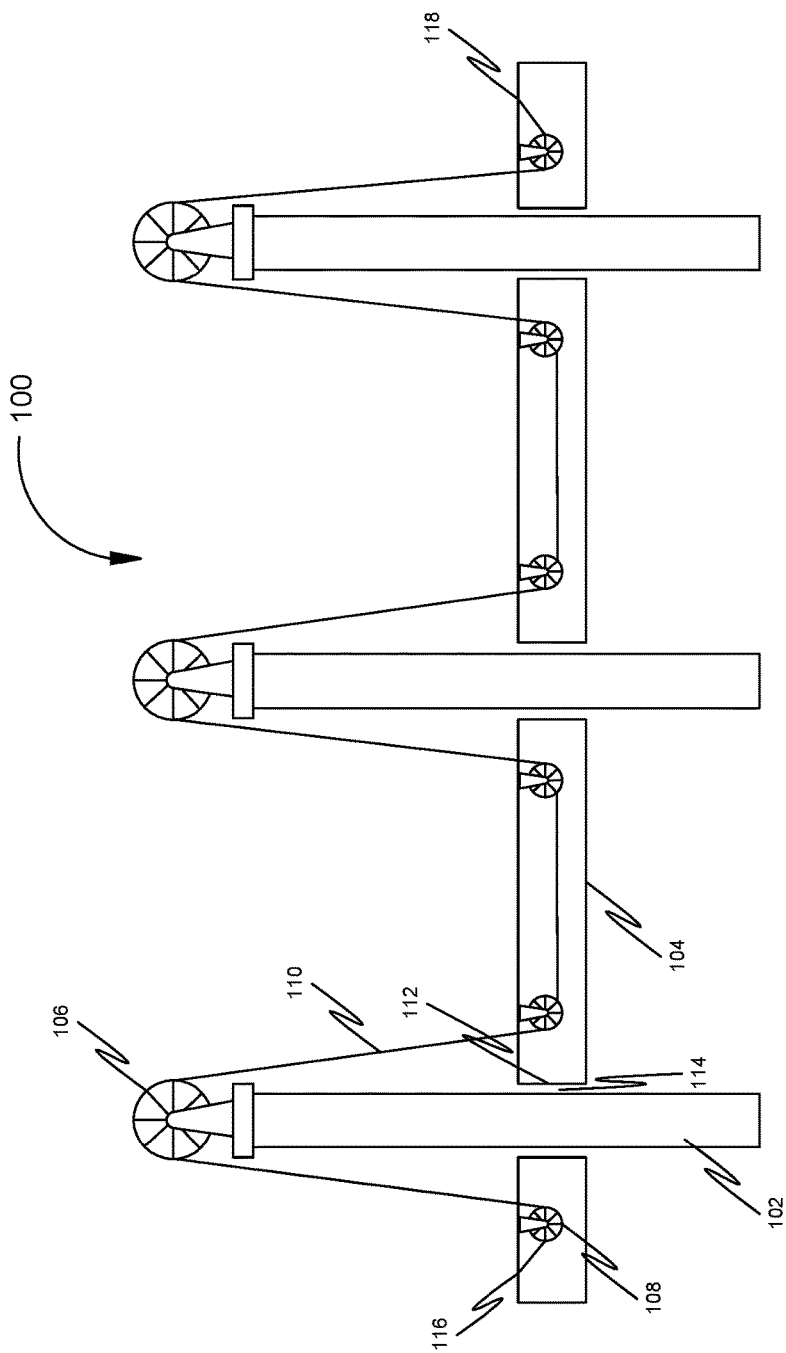
FIG. 2 shows a depiction of a suspension system comprising a plurality of shafts operably coupled through the joint efforts of a conduit of tensile force running through each of a counterpoised pulley and a pair of adjunct pulleys associated with each shaft in accordance with an exemplary embodiment of the present invention.

FIG. 2 shows a depiction of the suspension system 100 comprising a plurality of shafts 102 operably coupled through the joint efforts of a conduit of tensile force 110 running through each of a counterpoised pulley 106 and a pair of adjunct pulleys 108 associated with each shaft in accordance with an exemplary embodiment of the present invention. For instance, a counter poised pulley 106a mounted on the shaft 102a may be operably coupled to each of adjunct pulleys 108a-b through the conduit of tensile force 110. Further, one end of the conduit of tensile force 110 may be rigidly connected to the body 104 at the first place 116 while another end of the conduit of tensile force 110 may be rigidly connected to the body 104 at the second place 118.

Figure 3:
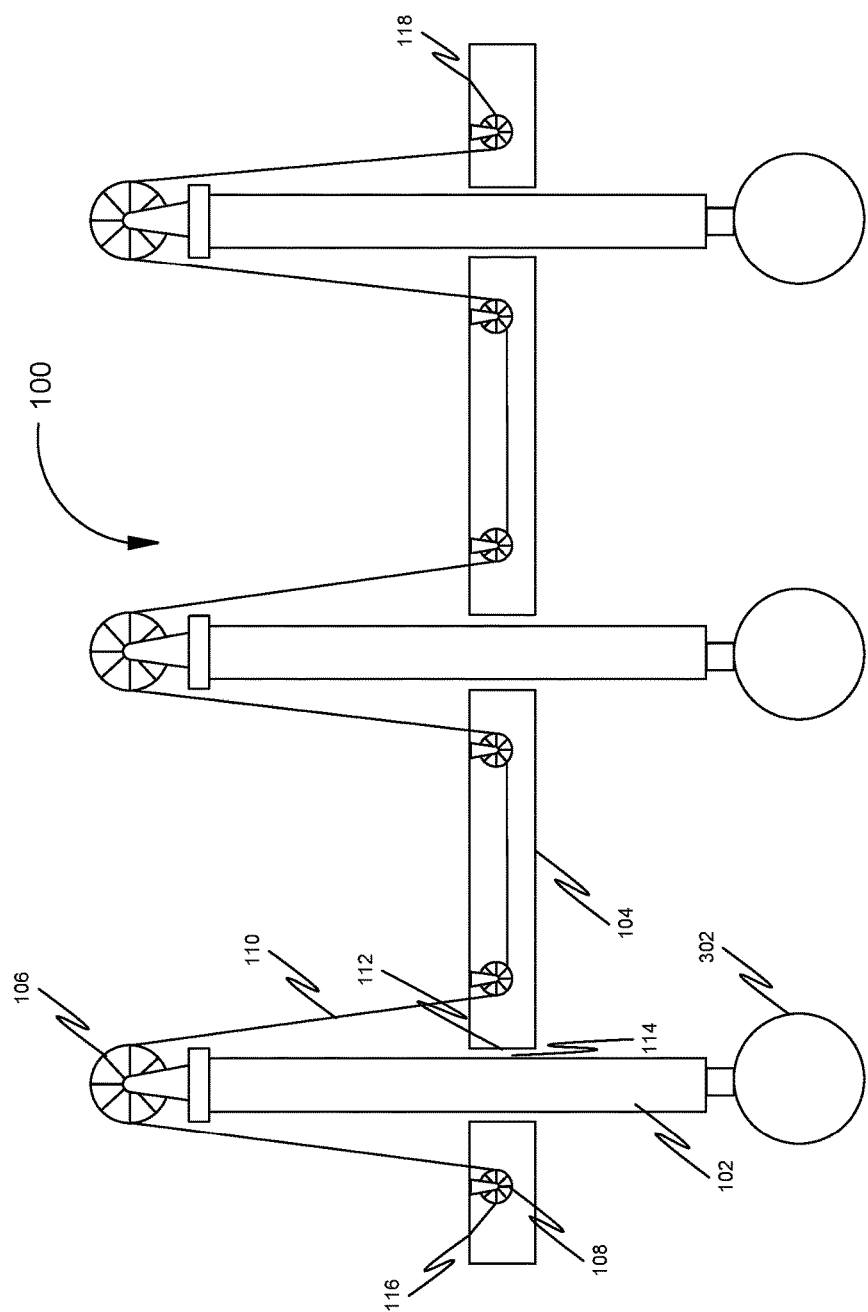
FIG. 3 shows a depiction of a suspension system comprising a plurality of shafts operably coupled with an arrangement of counterpoised pulleys and adjunct pulleys through a conduit of tensile force, wherein each shaft comprises a pontoon at one end in accordance with an exemplary embodiment of the present invention.

FIG. 3 shows a depiction of the suspension system 100 comprising a plurality of shafts 102 operably coupled with an arrangement of counterpoised pulleys 106 and adjunct pulleys 108 through a conduit of tensile force 110, wherein each shaft 102 comprises a pontoon 302 in accordance with an exemplary embodiment of the present invention. For instance, the pontoon 302 may be attached to one end 304 of one or more shafts 102. Further, each pontoon 302 may present a substantial surface area configured to receive a disturbing force. For example, in an implementation where the body 104 is configured to float on water, such as a lake, sea or ocean, the pontoons 302 may be configured as buoyant structures presenting a substantial area. Accordingly, disturbing forces, such as in the form of waves in the water may be incident on the pontoons 302 and cause translatory motion of corresponding shafts 102. Further, by virtue of the shafts 102 being interconnected through the arrangement of counterpoised pulleys 106, adjunct pulleys 108 and the conduit of tensile force 110, a disturbing force incident on a pontoon 302 of one of the shafts 102 may be transmitted to other shafts. As a result, a disturbing force in the form of a wave incident on one or more of the pontoons 302 may be expended and distributed through displacements of the plurality of shafts 102 along their longitudinal axis.

More generally, in some embodiments, the suspension system 100 may include a plurality of potential-energy storage means, an example of which is the pontoon 302, attached to the plurality of shafts 102. Further, a potential-energy storage means may be configured to store potential energy when resisting a linear motion of a shaft 102 with respect to a tube 112. Furthermore, the potential-energy storage means may be further configured to release the potential energy when supporting an opposite relative motion of shaft 102 with respect to said tube 112.

Figure 4A:
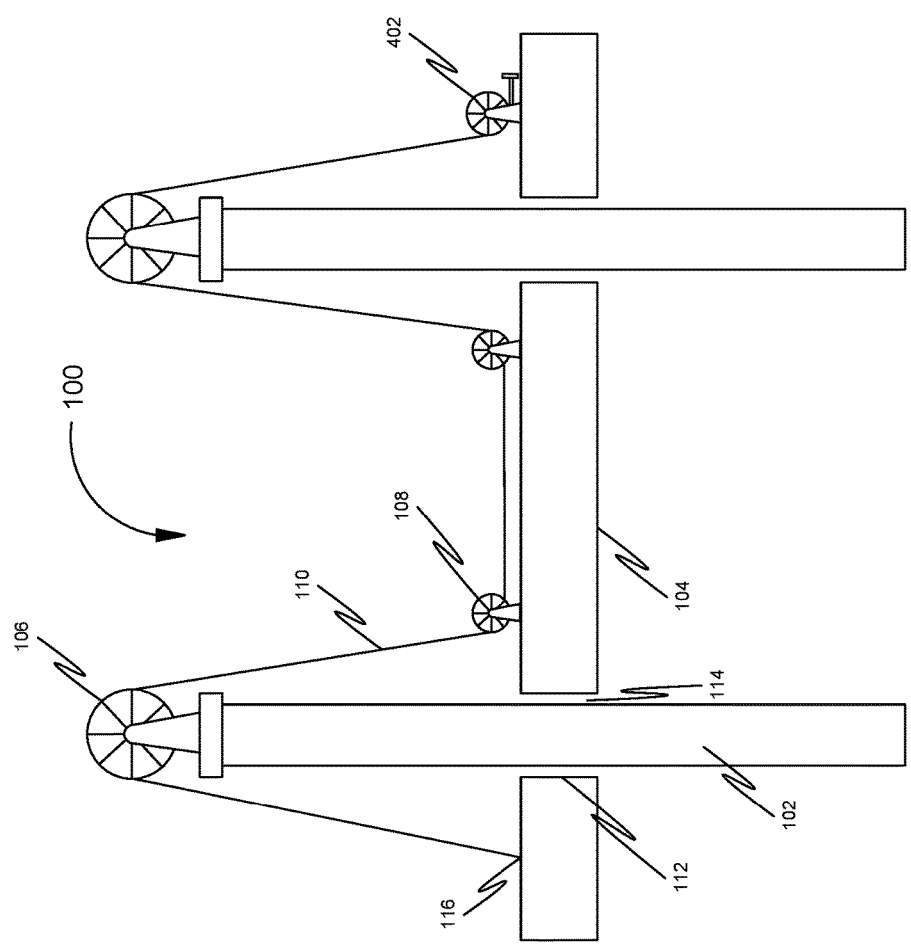
FIG. 4a shows a depiction of suspension system comprising a plurality of shafts operably coupled with an arrangement of counterpoised pulleys, adjunct pulleys and a winch through a conduit of tensile force, wherein the adjunct pulleys are disposed external to an associated body in accordance with an exemplary embodiment of the present invention.

FIG. 4a shows a depiction of the suspension system 100 comprising a plurality of shafts 102 operably coupled with an arrangement of counterpoised pulleys 106, adjunct pulleys 108 and a winch 402 through a conduit of tensile force 110, wherein the adjunct pulleys 108 are disposed external to the body 104 in accordance with an exemplary embodiment of the present invention. Accordingly, the winch 402 may be attached to the body 104. Further, a first end of the conduit of tensile force 110 may be rigidly connected to the body 104. Furthermore, the second end of the conduit of tensile force 110 may be operatively coupled to the winch 402. Additionally, a magnitude of tension in the conduit of tensile force may be controllable by cranking the winch 402. In an instance, cranking of the winch 402 may be performed manually by means of cranking arm coupled to the winch 402. In another instance, cranking of the winch 402 may be performed using an electric motor operably coupled to the winch 402.

Figure 4B:
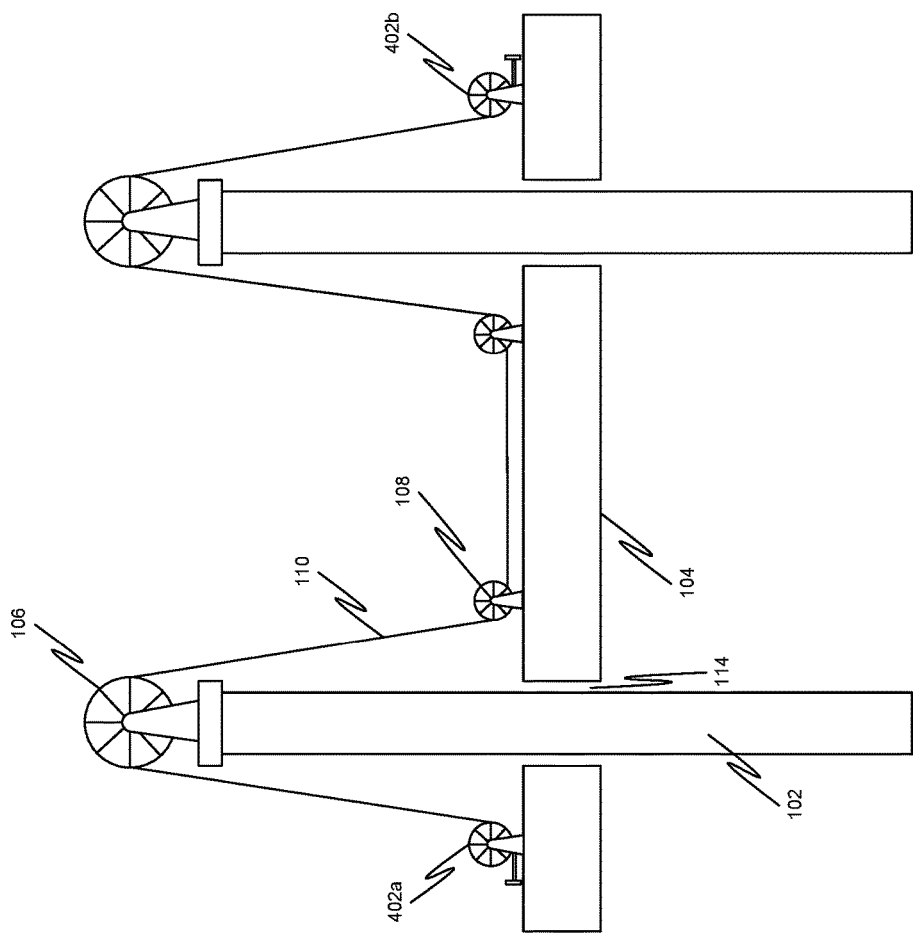
FIG. 4b shows a depiction of suspension system comprising a plurality of shafts operably coupled with an arrangement of counterpoised pulleys, adjunct pulleys and a plurality of winches through a conduit of tensile force, wherein the adjunct pulleys are disposed external to an associated body in accordance with an exemplary embodiment of the present invention.

FIG. 4b shows a depiction of the suspension system 100 comprising a plurality of shafts 102 operably coupled with an arrangement of counterpoised pulleys 106, adjunct pulleys 108 and a plurality of winches 402a and 402b through a conduit of tensile force 110, wherein the adjunct pulleys 108 are disposed external to the body 104 in accordance with an exemplary embodiment of the present invention. Accordingly, a first end of the conduit of tensile force 110 may be operably coupled to the winch 402a. Furthermore, the second end of the conduit of tensile force 110 may be operatively coupled to the winch 402b. Additionally, a magnitude of tension in the conduit of tensile force may be controllable by cranking one or more of the winch 402a and winch 402b.

Figure 5:
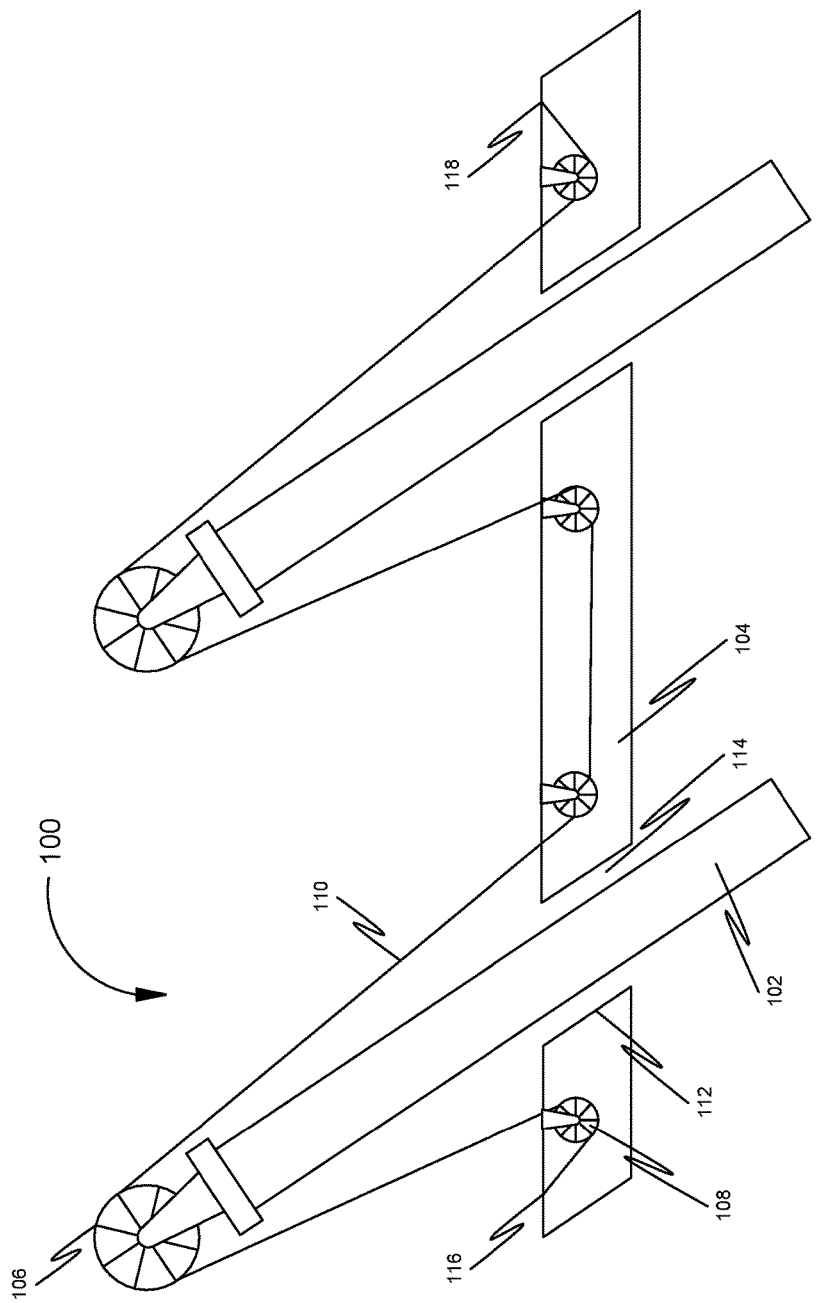
FIG. 5 shows a depiction of a suspension system comprising a plurality of shafts oriented at an angle with respect to a major plane of an associated body and operably coupled through an arrangement of counterpoised pulleys, adjunct pulleys and a conduit of tensile force in accordance with an exemplary embodiment of the present invention.

FIG. 5 shows a depiction of the suspension system 100 comprising a plurality of shafts 102 oriented at an acute (or obtuse) angle with respect to a major plane of the body 104 and operably coupled through an arrangement of counterpoised pulleys 106, adjunct pulleys 108 and a conduit of tensile force 110 in accordance with an exemplary embodiment of the present invention. As a result, a longitudinal axis of the shafts 102 is also oriented at the acute (or obtuse) angle with respect to the major plane of the body 104. Accordingly, disturbing forces incident on the shafts 102 may cause displacements of the shafts 102 along the acute angle (or obtuse angle). In an instance, a direction of the disturbing force may be along the longitudinal axis, such as for example, in the case of a wave. In another instance, a disturbing force at the shaft 102 acting along any arbitrary angle with respect to the major plane of the body 104 may produce a non-zero component of force along the longitudinal axis.

Further, support forces derived from shafts 102 may each have a horizontal component. Furthermore, the sum of the lateral components of forces corresponding to the shafts 102 must equal zero. Additionally, winching the conduit of tensile force 110 in may bring more height and stability to small land or sea vessels equipped with the suspension system 100. Further, in some instances, the suspension system 100 depicted in FIG. 5 may be based on a shuttlecock design. Accordingly, the shafts 102 may be oriented in the form of feathers of a shuttlecock with the lower ends of the shafts 102 (containing for example pontoons) spread out. For this shuttlecock design, winching the conduit of tensile force 110 in may force the lower ends of the shafts 102 (containing for example pontoons) into a larger circle, resulting in improved stability.

Figure 6A:
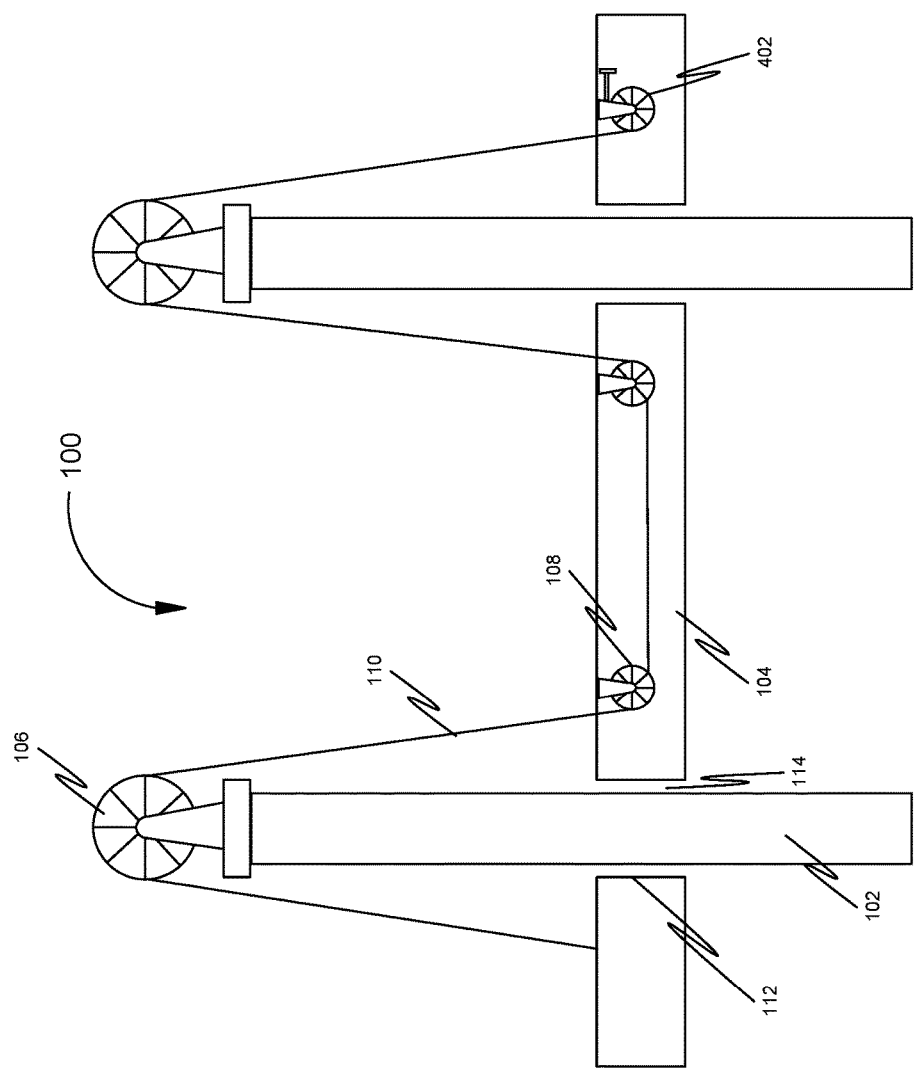
FIG. 6a shows a depiction of suspension system comprising a plurality of shafts operably coupled with an arrangement of counterpoised pulleys, adjunct pulleys and a winch through a conduit of tensile force, wherein the adjunct pulleys are disposed internal to an associated body in accordance with an exemplary embodiment of the present invention.

FIG. 6a shows a depiction of the suspension system 100 comprising a plurality of shafts 102 operably coupled with an arrangement of counterpoised pulleys 106, adjunct pulleys 108 and a winch 402 through a conduit of tensile force 110, wherein the adjunct pulleys 108 are disposed internal to the body 104 in accordance with an exemplary embodiment of the present invention. As a result, the adjunct pulleys 108 may not occupy space over the body 104, which may therefore be used for other purposes. Moreover, the adjunct pulleys 108 may be protected from adverse conditions of the environment, such as moisture, heat, light, wind and so on. Further, at least a part of the conduit of tensile force 110 may lie within the interior space.

Figure 6B:
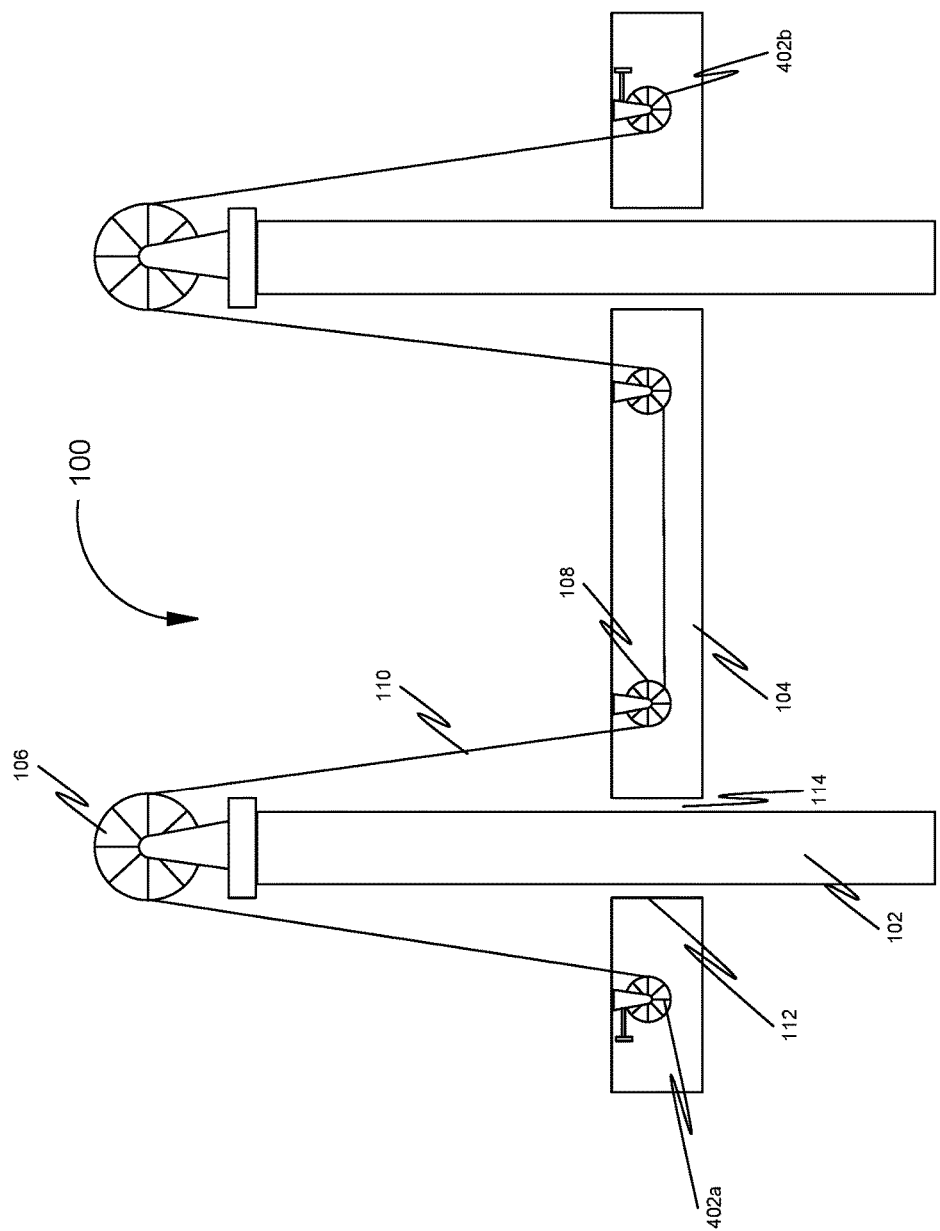
FIG. 6b shows a depiction of suspension system comprising a plurality of shafts operably coupled with an arrangement of counterpoised pulleys, adjunct pulleys and a plurality of winches through a conduit of tensile force, wherein the adjunct pulleys are disposed internal to an associated body in accordance with an exemplary embodiment of the present invention.

FIG. 6b shows a depiction of the suspension system 100 comprising a plurality of shafts 102 operably coupled with an arrangement of counterpoised pulleys 106, adjunct pulleys 108 and a plurality of winches 402a and 402b through a conduit of tensile force 110, wherein the adjunct pulleys 108 are disposed internal to the body 104 in accordance with an exemplary embodiment of the present invention. Accordingly, a first end of the conduit of tensile force 110 may be operably coupled to the winch 402a. Furthermore, the second end of the conduit of tensile force 110 may be operatively coupled to the winch 402b. Additionally, a magnitude of tension in the conduit of tensile force may be controllable by cranking one or more of the winch 402a and winch 402b.

Figure 7A:
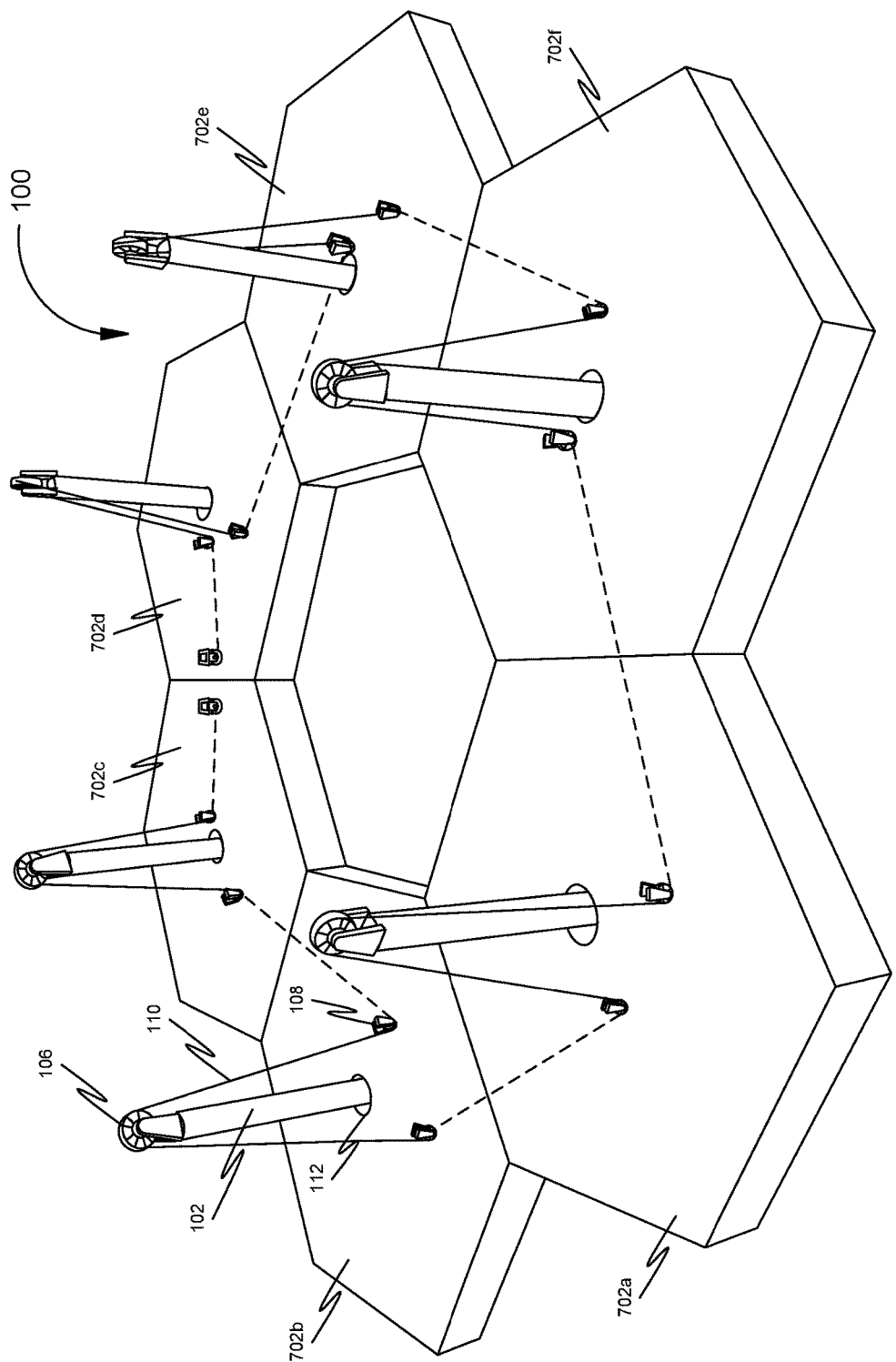
FIG. 7a shows a depiction of a suspension system associated with a body comprising a plurality of segments, wherein the suspension system comprises a plurality of shafts equidistantly disposed and operably coupled through the joint efforts of counterpoised pulleys, adjunct pulleys, a conduit of tensile force and a plurality of winches in accordance with an exemplary embodiment of the present invention.

FIG. 7a shows a depiction of a suspension system 100 associated with the body 104 comprising a plurality of segments 702a-f, wherein the suspension system 100 comprises a plurality of shafts 102 equidistantly disposed and operably coupled through the joint efforts of counterpoised pulleys 106, adjunct pulleys 108, a conduit of tensile force 110 and a plurality of winches 402a-b in accordance with an exemplary embodiment of the present invention. Further, at least two adjacent segments of the plurality of segments 702a-f may be interconnected through a pivotal join. Furthermore, the suspension system 100 may further include at least one latching means (not shown in figure) configured to separably interconnect the at least two adjacent segments. Further, the pivotal join may range over two or more, pivotal angles of interconnection and by an unlatching and relatching, said join may then be brought into particular angles. Accordingly, while the body 104 is an operational state, the plurality of segments 702a-f may be interconnected together by activating the at least one latching means. On the other hand, while the body 104 is to be disassembled or otherwise reorganized, the plurality of segments 702a-f may be detached from each other by deactivating the at least one latching means.

Further, as illustrated, a shaft of the plurality of shafts 102 may be disposed at a central location on each segment of the plurality of segments 702a-f. For example, the shafts 102 may be disposed at respective centers of hexagonal segments 702a-f. More precisely, corresponding tubes 112 may be disposed at the centers of hexagonal segments 702a-f, wherein the shafts 102 pass through respective tubes 112. Accordingly, in some embodiments, a uniform distribution of the shafts 102 over the body 104 may be obtained. As a result, overall stability of the body 104 may be improved. Further, as explained in the foregoing, a disturbing force impinging on one or more of the shafts 102 is distributed to other shafts 102 through the arrangement of counterpoised pulleys 106, adjunct pulleys 108 and the conduit of tensile force 110.

Figure 7B:
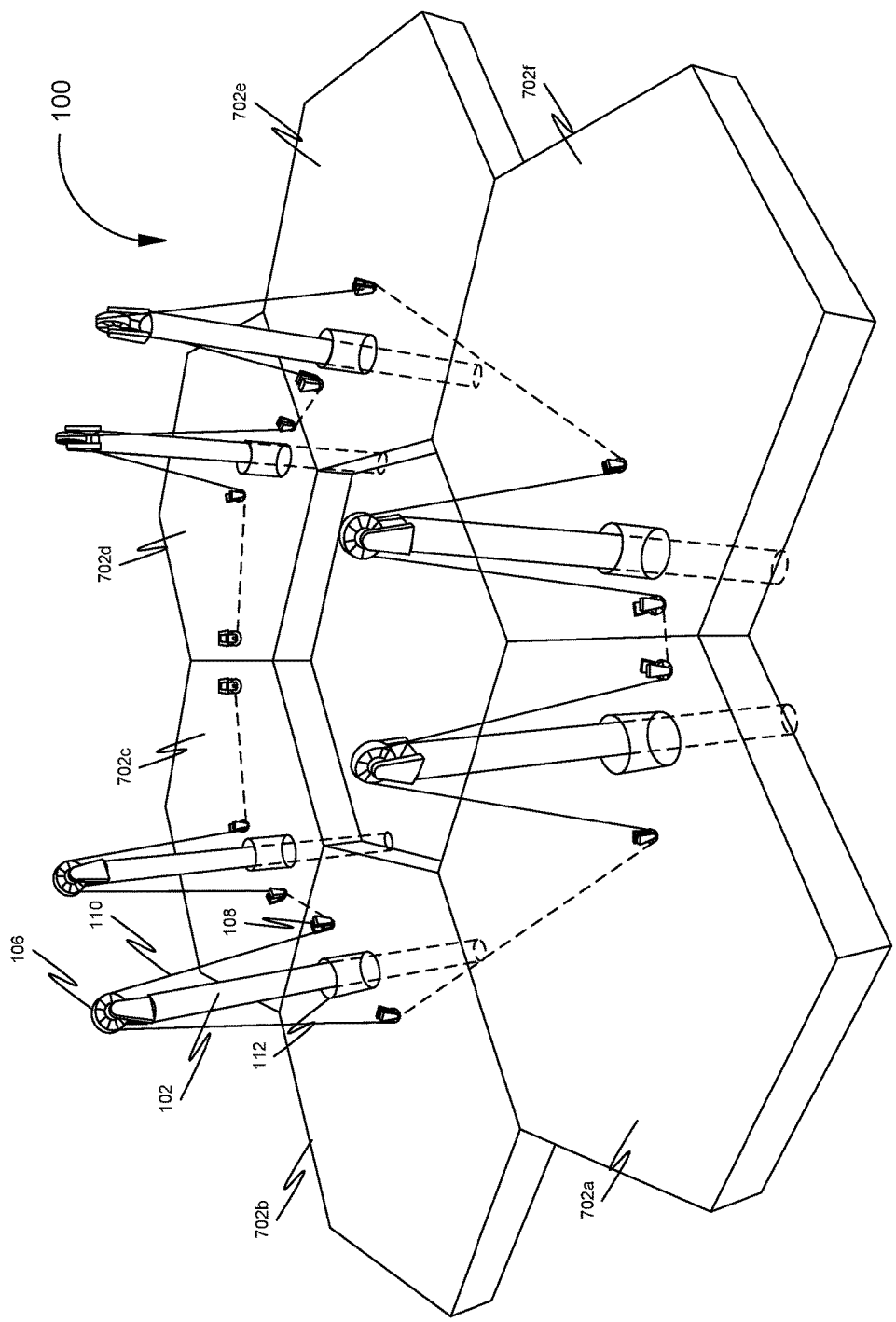
FIG. 7b shows a depiction of a suspension system associated with a body comprising a plurality of segments, wherein the suspension system comprises a plurality of shafts non-equidistantly disposed and operably coupled through the joint efforts of counterpoised pulleys, adjunct pulleys, a conduit of tensile force and a plurality of winches in accordance with an exemplary embodiment of the present disclosure.

FIG. 7b shows a depiction of the suspension system 100 associated with the body 104 comprising a plurality of segments 702a-f, wherein the suspension system 100 comprises a plurality of shafts 102 non-equidistantly disposed and operably coupled through the joint efforts of counterpoised pulleys 106, adjunct pulleys 108, a conduit of tensile force 110 and a plurality of winches 402a-b in accordance with an exemplary embodiment of the present disclosure. As shown, a spacing between adjacent shafts of the plurality of shafts 102 may be variable. For example, in some instances, due to a weight distribution of other structures on the body 104 it may not be preferable to maintain an equidistant spacing between adjacent shafts 102. Accordingly, the spacing between adjacent shafts 102 may be variably determined in order to achieve an overall stability of the body 104 and the suspension system 100.

C. Working of the Invention

Referring to FIG. 1, at an equilibrium, each of shaft 102a and 102b may be positioned with equal heights above the body 104 as illustrated in the figure. In other words, at equilibrium, the height of counterpoised pulley 106a is identical to the height of counterpoised pulley 106b above the body 104. Further, due to tautness established in the conduit of tensile force 110, any disturbing force impinging on one of shaft 102a and 102b would be transmitted to the other shaft 102.

For example, assume a disturbing force "F" impinging on the lower end of shaft 102b in an upward direction. Accordingly, as a result of the shaft 102a being translatable through a corresponding tube 112, the shaft 102b may be displaced upwards by a distance "d" due to force "F". Since both shafts 102a and 102b are coupled together through the conduit of tensile force 110 passing around counterpoised pulleys 106 and adjunct pulleys 108, and also due to the tautness of the conduit of tensile force 110, an upward displacement of the shaft 102b by distance "d" would cause a downward displacement of shaft 102a by the same distance "d". In other words, since the length of the conduit of tensile force 110 remains fixed, the upward displacement of shaft 102b causes a longer portion of the conduit of tensile force to be pulled towards the shaft 102b and would accordingly result in a shorter portion of the conduit of tensile force 110 being available to pass over the shaft 102a. This is assuming that the conduit of tensile force 110 does not undergo substantial change in length due to tensile forces. Therefore, for each upward displacement "d" of the shaft 102b, the suspension system 100 is configured to cause a downward displacement "d" of the shaft 102a. Similarly, for each downward displacement "d" of the shaft 102b, the suspension system 100 is configured to cause an upward displacement "d" of the shaft 102a. Accordingly, since displacement inherently implies action by a force, the disturbing force "F" impinging on the shaft 102b is distributed equally between the shafts 102b and 102a.

Accordingly, an upward thrust upon the shaft 102b is conducted to the other shaft 102a consequently raising the remainder of the body 104 from the water and/or land on which the body 104 rests. Likewise, a downward relaxation of the shaft 102b is conducted to the other shaft 102a consequently lowering the remainder of the body 104 towards the water and/or land on which the body 104 rests.

More generally, in case the suspension system 100 comprises "N" number of shafts 102, the force impinging on one of the "N" shafts 102 would be distributed to each of the other shafts 102. Further, the force impinging on the shaft may be as a result of the body 104 interacting with a surrounding environment. For instance, in some embodiments, the body 104 may be a vehicle capable of moving on land. Accordingly, the "N" shafts may include corresponding wheels attached to respective lower ends of the "N" shafts. As a result, while moving on an uneven terrain comprising bumps and dips, due to the weight of the body 104, forces may be impinged on one or more of the "N" shafts. For example, when a wheel encounters a bump, a shaft attached to the wheel would experience an upward force. Likewise, when the wheel encounters a dip, due to the weight of the body, the shaft would experience a downward force.

In other words, a thrust upon a shaft towards a corresponding counterpoised pulley is delivered as a tensile force through a corresponding conduit of tensile force to potential energy storage means associated with the other shafts operably coupled to the shaft through the joint efforts of the conduit of tensile force running through counterpoised pulleys and adjunct pulleys. The potential energy storage means associated with the other shafts may include, but are not limited to, components of the suspension system 100 such as pontoons, springs etc. interacting with an external environment of the body 104 such as water or land. On the other hand, a void in force experienced by the shaft is quickly filled by a thrust delivered as tensile force through the conduit of tensile force from the potential energy storage devices of the other shafts, but which is in a direction away from the counterpoised pulley.

Assuming that each of the shafts 102 are identical in terms of their construction and dynamics, a disturbing force "F" (upward or downward) acting on a shaft of the "N" shafts 102 causing a displacement of "d" (either upward or downward respectively) would result in each of the other shafts to be displaced (either downward or upward respectively) by a distance $d/(N-1)$. In other words, for a force of "F" impinging on the shaft of the "N" shafts 102, a force of F/2 would be expended in displacing the shaft while a force of F/2 would be equally distributed amongst the (N-1) other shafts 102. Accordingly, a force of $(F/2)/(N-1)$ would be impinged on each of the (N-1) other shafts 102. Similarly, in a case where disturbing forces are simultaneously impinged on multiple shafts, the distribution of force may be determined using the superposition principle and/or calculus. Alternatively, and/or additionally, the distribution of the disturbing forces may also be determined based on a calculation of weights. For instance, an upward force of x tons on the shaft would bring a downward compensation of $x/(N-1)$ tons for each of the remaining (N-1) shafts. Similarly, a downward force of x tons would bring an upward compensation of $x/(N-1)$ tons for each of the remaining (N-1) shafts.

In other words, a force of "F", impinging on a shaft of the "N" shafts 102, imposes a tension increase of F/2 on a conduit of tensile force corresponding to the shaft. The tension increase is distributed throughout the conduit of tensile force with the following impacts upon the potential energy storage means of said conduit: an increased force in the same direction of F/2 on the body 104 at each corresponding adjunct pulley 108 and end point; and an increased force of F on each of the N-1 other shafts but in the opposite direction. Upon completion of its work against all potential energy storage means associated with the conduit of tensile force, the original force F will have displaced the shaft through a distance "d" relative to the body 104, with all of the resulting potential energy, F*d, stored in the potential energy storage means associated with the conduit of tensile force as follows: $\mu*(F*d)$ to the body 104, $(1-\mu)*(F*d)$ to the shafts 102 in total, and $(1-\mu)*(F*d)/(N-1)$ stored in each shaft. In practice, $\mu$ is a parameter that depends on a ratio involving the weight of the body 104, gravity and the total potential energy stored in the shafts 102, per foot. At this point, with an elevation of the body 104, the tension in the conduit of tensile force would have returned to body weight/ $(2*N)$.

The disclosed devices and systems include at least the following aspects:

Aspect 1: A suspension system configured for distributing forces about to impinge on a body, the suspension system comprising: (i) a plurality of tubes, wherein a tube comprises a hollow space configured to accommodate at least a part of a shaft, wherein, the tube is configured to allow translatory motion of the shaft relative to the tube, wherein the translatory motion is substantially one dimensional, wherein a first portion of the tube is rigidly connected to at least a part of the body; (ii) a plurality of shafts corresponding to the plurality of tubes, wherein a shaft corresponding to a tube is configured to be at least partially accommodated within a hollow space of the tube; (iii) a plurality of pulleys, wherein the plurality of pulleys comprises at least one counterpoised pulley mounted on at least one end of at least one shaft of the plurality of shafts and at least two adjunct pulleys mounted on the body; and (iv) at least one conduit of tensile force, wherein a first end of the at least one conduit of tensile force is connected to a first place of the body and a second end of the at least one conduit of tensile force is connected to a second place of the body, wherein the at least one conduit of tensile force is operationally coupled to each of the at least one counterpoised pulleys and the at least two adjunct pulleys, wherein a force acting upon a shaft of the plurality of shafts is transmitted at least partially, via counterpoised pulleys and the at least one conduit of tensile force, to each of the one or more other shafts of the plurality of shafts, the first place of the body and the second place of the body.

Aspect 2: The suspension system of aspect 1, wherein a longitudinal axis of the plurality of shafts is substantially perpendicular to a major plane of the body.

Aspect 3: The suspension system of aspect 1, wherein a form of each of the hollow space and a part of the shaft is cylindrical.

Aspect 4: The suspension system of aspect 1, wherein each of a tube of the plurality of tubes and a shaft of the plurality of shafts corresponding to the tube is configured to minimize wobbling of the shaft in relation to the tube.

Aspect 5: The suspension system of aspect 1, wherein the at least two adjunct pulleys are mounted within an interior space of the body, wherein at least a part of the at least one conduit of tensile force lies within the interior space.

Aspect 6: The suspension system of aspect 1, wherein the at least one counterpoised pulley comprises a plurality of counterpoised pulleys, and the at least one conduit of tensile force is operatively coupled to each of the plurality of counterpoised pulleys.

Aspect 7: The suspension system of aspect 1, wherein the at least one conduit of tensile force comprises a plurality of conduits of tensile force, wherein a plurality of first ends of the plurality of conduits of tensile force are rigidly connected respectively to each of a plurality of first places of the body and a plurality of second ends of the plurality of conduits of tensile force are rigidly connected respectively to each of a plurality of second places of the body, wherein the plurality of conduits of tensile force is operationally coupled to the plurality of pulleys, wherein a force acting upon the shaft of the plurality of shafts is transmitted at least partially, through a single member of the plurality of conduits of tensile force, along those pulleys operationally coupled to it, and on to a single member pair from the plurality of first places and the plurality of second places.

Aspect 8: The suspension system of aspect 7, wherein said force acting upon said shaft of said plurality of shafts is transmitted at least partially through an additional member of the plurality of conduits of tensile strength along those pulleys operationally coupled to said additional member, and on to an additional member pair from the plurality of first places and the plurality of second places.

Aspect 9: The suspension system of aspect 7, whereby virtue of claim 8, is extended inductively from its single member of the plurality of conduits of tensile force to as many additional as are deemed necessary.

Aspect 10: The suspension system of aspect 1, wherein the conduit of tensile force is at least one of a rope, a chain and a cable.

Aspect 11: The suspension system of aspect 1, wherein a longitudinal axis of the plurality of shafts is aligned parallel to the direction of the force about to impinge.

Aspect 12: The suspension system of aspect 1, wherein the body is a mooring.

Aspect 13: The suspension system of aspect 1 further comprising an electrical generator, wherein the electrical generator is mechanically coupled with at least one of a tube, a shaft, a pulley and a conduit of tensile force, wherein the electrical generator is configured to convert at least one of a rotatory motion, a linear motion and mechanical stress into electricity.

Aspect 14: The suspension system of aspect 1 further comprising a plurality of potential-energy storage means attached to the plurality of shafts, wherein a potential-energy storage means is configured to store potential energy when resisting a linear motion of a shaft with respect to a tube, wherein the potential-energy storage means is further configured to release the potential energy when supporting an opposite relative motion of shaft with respect to said tube.

Aspect 15: The suspension system of aspect 1, wherein at least one of the plurality of pulleys is a bearing pulley.

Aspect 16: The suspension system of aspect 1 further comprising a thrust bearing corresponding to each counterpoised pulley, wherein said thrust bearing is inserted between said pulley and said pulley's corresponding shaft, and wherein the thrust bearing bears load in a direction axially parallel to said shaft.

Aspect 17: The suspension system of aspect 1 further comprising at least one winch attached to the body, wherein the first end of the at least one conduit of tensile force is rigidly connected to the body, wherein the second end of the at least one conduit of tensile force is operatively coupled to the at least one winch, wherein a magnitude of tension in the at least one conduit of tensile force is controllable by cranking the at least one winch.

Aspect 18: The suspension system of aspect 1, wherein the body comprises a plurality of segments, wherein at least two adjacent segments of the plurality of segments are interconnected through a pivotal join.

Aspect 19: The suspension system of aspect 18 further comprising at least one latching means configured to separably interconnect the at least two adjacent segments.

Aspect 20: The suspension system of aspect 16 further comprising a plurality of latching nubs corresponding to the plurality of shafts, wherein each latching nub is configured to encircle and protrude from a corresponding shaft at or near its poising end, wherein each latching nub is configured to act as a latching point for deactivation and reactivation of a potential energy storage means attached to a particular shaft by halting or allowing translation of said shaft along its tube.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A suspension system configured for distributing forces about to impinge on a body, the suspension system comprising:
    a plurality of tubes, wherein each tube comprises a hollow space configured to accommodate at least a part of a shaft, wherein, the tube is configured to allow translatory motion of the shaft relative to the tube, wherein the translatory motion is substantially one dimensional, wherein a first portion of the tube is rigidly connected to at least a part of the body;
    a plurality of shafts corresponding to the plurality of tubes, wherein a shaft corresponding to a tube is configured to be at least partially accommodated within a hollow space of the tube;
    a plurality of pulleys, wherein the plurality of pulleys comprises at least one counterpoised pulley mounted on at least one end of at least one shaft of the plurality of shafts and at least two adjunct pulleys mounted on the body; and
    at least one conduit of tensile force, wherein a first end of the at least one conduit of tensile force is connected to a first place of the body and a second end of the at least one conduit of tensile force is connected to a second place of the body, wherein the at least one conduit of tensile force is operationally coupled to each of the at least one counterpoised pulleys and the at least two adjunct pulleys, wherein a force acting upon a shaft of the plurality of shafts is transmitted at least partially, via counterpoised pulleys and the at least one conduit of tensile force, to each of the one or more other shafts of the plurality of shafts, the first place of the body and the second place of the body.

2. The suspension system of claim 1, wherein a longitudinal axis of the plurality of shafts is substantially perpendicular to a major plane of the body.

3. The suspension system of claim 1, wherein a form of each of the hollow space and a part of the shaft is cylindrical.

4. The suspension system of claim 1, wherein each of a tube of the plurality of tubes and a shaft of the plurality of shafts is configured to minimize wobbling of the shaft in relation to the tube.

5. The suspension system of claim 1, wherein the at least two adjunct pulleys are mounted within an interior space of the body, wherein at least a part of the at least one conduit of tensile force lies within the interior space.

6. The suspension system of claim 1, the at least one counterpoised pulley comprises a plurality of counterpoised pulleys, wherein the at least one conduit of tensile force is operatively coupled to each of the plurality of counterpoised pulleys.

7. The suspension system of claim 1, wherein the at least one conduit of tensile force comprises a plurality of conduits of tensile force, wherein a plurality of first ends of the plurality of conduits of tensile force are rigidly connected respectively to each of a plurality of first places of the body and a plurality of second ends of the plurality of conduits of tensile force are rigidly connected respectively to each of a plurality of second places of the body, wherein the plurality of conduits of tensile force is operationally coupled to the plurality of pulleys, wherein a force acting upon the shaft of the plurality of shafts is transmitted at least partially, through a single member of the plurality of conduits of tensile force, along the pulleys of the plurality of pulleys operationally coupled to it, and on to a single member pair from the plurality of first places and the plurality of second places.

8. The suspension system of claim 7, wherein said force acting upon said shaft of said plurality of shafts is transmitted at least partially through an additional member of the plurality of conduits of tensile strength along the pulleys of the plurality of pulleys operationally coupled to said additional member, and on to an additional member pair from the plurality of first places and the plurality of second places.

9. The suspension system of claim 7, whereby virtue of claim 8, is extended inductively from its single member of the plurality of conduits of tensile force to as many additional as are deemed necessary.

10. The suspension system of claim 1, wherein the conduit of tensile force is at least one of a rope, a chain and a cable.

11. The suspension system of claim 1, wherein a longitudinal axis of the plurality of shafts is aligned parallel to the direction of the force about to impinge.

12. The suspension system of claim 1, wherein the body is a mooring.

13. The suspension system of claim 1 further comprising an electrical generator, wherein the electrical generator is mechanically coupled with at least one of a tube, a shaft, a pulley and a conduit of tensile force, wherein the electrical generator is configured to convert at least one of a rotatory motion, a linear motion and mechanical stress into electricity.

14. The suspension system of claim 1 further comprising a plurality of potential-energy storage means attached to the plurality of shafts, wherein the potential-energy storage means is configured to store potential energy when resisting a linear motion of the shaft with respect to the tube, wherein the potential-energy storage means is further configured to release the potential energy when supporting an opposite relative motion of the shaft with respect to said tube.

15. The suspension system of claim 1, wherein at least one of the plurality of pulleys is a bearing pulley.

16. The suspension system of claim 1 further comprising a thrust bearing corresponding to each counterpoised pulley, wherein said thrust bearing is inserted between said pulley and said pulley's corresponding shaft, and wherein the thrust bearing bears load in a direction axially parallel to said shaft.

17. The suspension system of claim 1 further comprising at least one winch attached to the body, wherein the first end of the at least one conduit of tensile force is rigidly connected to the body, wherein the second end of the at least one conduit of tensile force is operatively coupled to the at least one winch, wherein a magnitude of tension in the at least one conduit of tensile force is controllable by cranking the at least one winch.

18. The suspension system of claim 1, wherein the body comprises a plurality of segments, wherein at least two adjacent segments of the plurality of segments are interconnected through a pivotal join.

19. The suspension system of claim 18 further comprising at least one latching means configured to separably interconnect the at least two adjacent segments.

20. The suspension system of claim 16 further comprising a plurality of latching nubs corresponding to the plurality of shafts, wherein each latching nub is configured to encircle and protrude from a corresponding said shaft at or near its poising end, wherein each latching nub is configured to act as a latching point for deactivation and reactivation of a potential energy storage means attached to a particular said shaft by halting or allowing translation of said shaft along the corresponding tube.

* * * * *